(12) United States Patent
Langevin et al.

(10) Patent No.: US 11,692,305 B2
(45) Date of Patent: Jul. 4, 2023

(54) FABRIC TREATMENT COMPOSITIONS WITH POLYMER SYSTEM AND RELATED PROCESSES

(71) Applicant: The Procter & Gamble Company, Cincinnati, OH (US)

(72) Inventors: Rebecca Ann Langevin, Norwood, OH (US); Rajan Keshav Panandiker, West Chester, OH (US); Brian Joseph Loughnane, Sharonville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 658 days.

(21) Appl. No.: 16/451,197

(22) Filed: Jun. 25, 2019

(65) Prior Publication Data

US 2020/0002885 A1 Jan. 2, 2020

Related U.S. Application Data

(60) Provisional application No. 62/691,013, filed on Jun. 28, 2018.

(51) Int. Cl.

| | | |
|---|---|---|
| *C11D 1/00* | (2006.01) | |
| *C11D 3/37* | (2006.01) | |
| *C11D 3/50* | (2006.01) | |
| *B08B 3/04* | (2006.01) | |
| *D06M 15/61* | (2006.01) | |

(Continued)

(52) U.S. Cl.
CPC ............ *D06M 15/61* (2013.01); *C08F 255/06* (2013.01); *C08F 271/00* (2013.01); *C08G 63/183* (2013.01); *C11D 3/3715* (2013.01); *C11D 3/3788* (2013.01); *D06M 15/333* (2013.01); *D06M 15/507* (2013.01); *C11D 1/02* (2013.01); *C11D 3/373* (2013.01); *C11D 3/50* (2013.01); *C11D 3/505* (2013.01);
(Continued)

(58) Field of Classification Search
CPC ........... C11D 1/00; C11D 3/37; C11D 3/3707; C11D 3/3715; C11D 3/3723; C11D 3/3788; C11D 3/50; B08B 3/04
See application file for complete search history.

(56) References Cited

U.S. PATENT DOCUMENTS

| | | |
|---|---|---|
| 4,116,885 A | 9/1978 | Derstadt |
| 4,329,389 A | 5/1982 | Kimbrell, Jr. |

(Continued)

FOREIGN PATENT DOCUMENTS

| | | |
|---|---|---|
| EP | 0112593 A2 | 7/1984 |
| EP | 2607469 A1 | 6/2013 |

(Continued)

OTHER PUBLICATIONS

International Search Report; International Application No. PCT/US2019/038897; dated Sep. 11, 2019; 13 pages.

(Continued)

*Primary Examiner* — Brian P Mruk
(74) *Attorney, Agent, or Firm* — Andrew J. Mueller (57) ABSTRACT

Fabric treatment compositions that include certain polymer systems, such as systems that include a first polymer that is a soil release polymer and a second polymer that is a graft copolymer (e.g., a PEG/vinyl acetate polymer), an alkoxylated polyalkyleneimine polymer, or a mixture thereof. Related processes and uses.

19 Claims, 1 Drawing Sheet

(51) Int. Cl.
*C08F 255/06* (2006.01)
*C08F 271/00* (2006.01)
*C08G 63/183* (2006.01)
*D06M 15/333* (2006.01)
*D06M 15/507* (2006.01)
*C11D 1/02* (2006.01)

(52) U.S. Cl.
CPC .... *D10B 2401/022* (2013.01); *D10B 2501/02* (2013.01); *D10B 2501/04* (2013.01)

(56) References Cited

U.S. PATENT DOCUMENTS

| | | | |
|---|---|---|---|
| 4,702,857 | A | 10/1987 | Gosselink |
| 4,968,451 | A | 11/1990 | Scheibel |
| 6,071,871 | A | 6/2000 | Gosselink |
| 6,326,447 | B1 | 12/2001 | Fitzgerald |
| 7,163,985 | B2 | 1/2007 | Ortiz |
| 7,442,213 | B2 | 10/2008 | Ortiz |
| 7,951,768 | B2 | 5/2011 | Boutique |
| 8,097,579 | B2 | 1/2012 | Danziger |
| 8,143,209 | B2 | 3/2012 | Boeckh |
| 9,683,199 | B2 | 6/2017 | Truong |
| 2008/0178396 | A1 | 7/2008 | Van |
| 2014/0296124 | A1* | 10/2014 | Hulskotter ............ C11D 1/008 510/300 |
| 2016/0090552 | A1* | 3/2016 | Lough ................ C11D 3/3707 510/300 |
| 2017/0191005 | A1 | 7/2017 | Foverskov |
| 2019/0144787 | A1 | 5/2019 | Pelletier |

FOREIGN PATENT DOCUMENTS

| | | | |
|---|---|---|---|
| EP | 3330345 A1 | 6/2018 | |
| EP | 3363884 | * 8/2018 | ............... C11D 1/14 |
| GB | 2304726 | * 9/1995 | ............... C11D 3/37 |
| GB | 2304726 A | 3/1997 | |
| JP | H11508318 A | 7/1999 | |
| WO | WO2009153184 A1 | 12/2009 | |
| WO | WO 2012/136427 | * 10/2012 | ............... C11D 3/00 |
| WO | WO2012136427 A1 | 10/2012 | |

OTHER PUBLICATIONS

Functional Chemicals; Clariant; Multifunctional Talents; TexCare SRN: Nonionic Soil Release Polymers; brochure, 6 pages, No Date Given.

* cited by examiner

FABRIC TREATMENT COMPOSITIONS WITH POLYMER SYSTEM AND RELATED PROCESSES

This application claims benefit of 62/691,013, filed on Jun. 28, 2018.

FIELD OF THE INVENTION

The present disclosure relates to fabric treatment compositions that include certain polymer systems, for example systems that include a first polymer that is a soil release polymer and a second polymer that is a graft copolymer, an alkoxylated polyalkyleneimine polymer, or a mixture thereof. The present disclosure also relates to related processes and uses.

BACKGROUND OF THE INVENTION

Garments intended for use as athletic wear are becoming more popular, even for use during non-athletic pursuits. Such garments are often valued for their wicking properties during wear, where water and sweat are drawn away from the body so that they can more easily be evaporated. However, over repeated washes and/or wears, the fabric, often a synthetic fabric, can lose its wicking properties.

For example, finishes applied by the manufacturer may be lost upon laundering the fabric. Additionally, build-up of soils (such as body soils that may accumulate during normal wear and/or athletic activity) on a fabric can inhibit wicking. The use of fabric softeners leads to deposition of hydrophobic actives onto the fabric's fibers, reducing their wicking ability.

When garments do not adequately wick moisture, the garments can become malodorous through a variety of mechanisms. Thus, it is believed that improved wicking correlates with improved malodor prevention.

There is a need for compositions and processes that improve the wicking of fabrics, particularly when the fabrics are used and/or washed repeatedly.

SUMMARY OF THE INVENTION

The present disclosure relates to compositions and process relating to polymer systems. For example, the present disclosure relates to a fabric treatment composition that includes (a) from about 1% to about 25%, by weight of the composition, of a first polymer, the first polymer being a soil release polymer (SRP); and (b) from about 1% to about 25%, by weight of the composition, of a second polymer, the second polymer being a graft copolymer, an alkoxylated polyalkyleneimine polymer, or a mixture thereof, where the graft copolymer, if present, includes (i) water-soluble polyalkylene oxides as a graft base, and (ii) one or more side chains formed by polymerization of a vinyl ester component; where the composition includes less than about 5%, by weight of the composition, of anionic surfactant.

The present disclosure also relates to a fabric treatment composition that includes (a) a first polymer, the first polymer being a soil release polymer; and (b) a second polymer, the second polymer being a graft copolymer, an alkoxylated polyalkyleneimine, or a mixture thereof, where the graft copolymer, if present, includes (i) water-soluble polyalkylene oxides as a graft base, and (ii) one or more side chains formed by polymerization of a vinyl ester component; where the total weight of (a)+(b) is from about 2% to about 30% by weight of the composition.

The present disclosure also relates to a process of treating a fabric, the process comprising the steps of: contacting a fabric with an aqueous treatment liquor, the aqueous treatment liquor including from about 10 to about 100 ppm of a PEG/vinyl acetate graft copolymer, and from about 10 to about 100 ppm of a terephthalate-derived soil release polymer.

The present disclosure also relates to a use of a PEG/vinyl acetate graft copolymer, optionally in combination with a terephthalate-derived soil release polymer, to improve or maintain wicking performance of a fabric after the fabric is treated with a composition that includes the copolymer compared to treating the fabric with a similar composition that does not include the copolymer.

BRIEF DESCRIPTION OF THE DRAWINGS

The FIGURES herein are illustrative in nature and are not intended to be limiting.

DETAILED DESCRIPTION OF THE INVENTION

The present disclosure relates to fabric treatment compositions that include certain polymer systems. The polymer system includes at least two polymers: a first polymer (a) which may be a soil release polymer, for example a terephthalate-derived SRP, and a second polymer (b), which may be a graft copolymer, an alkoxylated polyalkyleneimine polymer, or mixtures thereof; the graft polymer may be derived from (i) water-soluble polyalkylene oxides, such as ethylene oxides, as a graft base, and (ii) one or more side chains formed by polymerization of a vinyl ester component, such as vinyl acetate. It has been surprisingly found that compositions having these polymers at certain levels and/or ratios can provide and/or restore wicking properties of certain garments, such as those that include synthetic fibers. Such wicking benefits are believed to correlate to malodor-control benefits.

Without wishing to be bound by theory, it is believed that the second polymer (b) may remove and/or suspend soils, so that the soils do not inhibit the deposition and/or performance of the first polymer (a). Meanwhile, the first polymer (a) (e.g., an SRP) may deposit onto the fabric and facilitate the wicking performance. As shown in the examples below, it has been found that the polymers work surprisingly well in combination compared to either polymer alone, even during rinse cycles, when most soils would be expected to be taken care of during the wash.

The present disclosure also relates to processes of treating fabrics with such polymer systems and/or with such fabric treatment compositions, for example during the rinse cycle of an automatic washing machine.

The polymer systems, compositions, processes, and uses of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids.

A "solid" as used herein includes, but is not limited to, powders, agglomerates, and mixtures thereof. Non-limiting examples of solids include: granules, micro-capsules, pastilles or beads, noodles, and pearlised balls.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Treatment Composition

The present disclosure relates to fabric treatment compositions. As used herein the phrase "fabric treatment composition" includes compositions and formulations designed for treating fabric, including garments, or other textiles.

Such compositions may include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation, preferably during the rinse cycle.

The composition may be in any suitable form. The composition may be in the form of a liquid composition, a granular composition, a single-compartment pouch, a multi-compartment pouch, a sheet, a pastille or bead, a fibrous article, a tablet, a bar, flake, or a mixture thereof. The composition can be selected from a liquid, solid, or combination thereof.

The composition may be a liquid. The composition may include from about 30% to about 90%, or from about 50% to about 80%, by weight of the composition, of water. The composition may have a neat pH of from about 2, or from about 3, or from about 4, to about 7, or to about 6, or to about 5, or to about 4.5. Liquid compositions having an acidic pH may facilitate the physical stability of compositions that contain a chelant. The pH of the composition may be optimized to facilitate SRP stability, as some SRPs may be prone to hydrolysis at certain pHs.

The cleaning composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a pastille or bead. The pastille may include polyethylene glycol as a carrier. The polyethylene glycol may have a weight average molecular weight of from about 2000 to about 20,000 Daltons, preferably from about 5000 to about 15,000 Daltons, more preferably from about 6000 to about 12,000 Daltons.

The composition may comprise a non-aqueous solvent, which may act as a carrier and/or facilitate stability. Non-aqueous solvents may include organic solvents, such as methanol, ethanol, propanol, isopropanol, 1,3-propanediol, 1,2-propanediol, ethylene glycol, glycerine, glycol ethers, hydrocarbons, or mixtures thereof. Other non-aqueous solvents may include lipophilic fluids such as siloxanes or other silicones, hydrocarbons, perfluorinated amines, perfluorinated and hydrofluoroether solvents, or mixtures thereof. Amine-containing solvents, such as monoethanolamine, diethanolamine and triethanolamine, may be suitable.

The fabric treatment composition may comprise first polymer (a) which is a soil release polymer (such as a terphthalate-derived soil release polymer), and second polymer (b) selected from a PEG/vinyl acetate graft copolymer, an alkoxylated polyalkyleneimine polymer, or mixtures thereof. Polymers (a) and (b) may form a polymer system. The polymer system may include additional polymers, preferably polymers that provide a benefit to fabrics. As shown by the examples below, fabric treatment compositions that include polymers (a) and (b) in combination provide superior wicking benefits to fabrics when compared to compositions that comprise only polymer (a) or polymer (b).

Polymers (a) and (b) may be present at levels sufficient to provide a wicking benefit to a fabric. The composition may include polymers (a) and (b) such that the total weight of (a)+(b) is from about 2% to about 30%, or from about 3% to about 30%, or from about 4% to about 30%, or from about 5% to about 30%, or from about 7% to about 25%, or from about 8% to about 20%, by weight of the composition. The composition may include at least about 1%, or at least about 2%, or at least about 3%, or at least about 4%, or at least about 5%, or at least about 6%, or at least about 7%, or at least about 8%, or at least about 9%, or at least about 10%, by weight of the composition of polymer (a). The composition may include at least about 1%, or at least about 2%, or at least about 3%, or at least about 4%, or at least about 5%, or at least about 6%, or at least about 7%, or at least about 8%, or at least about 9%, or at least about 10%, by weight of the composition of (b).

The composition may include from about 1% to about 25%, by weight of the composition, of first polymer (a). The composition may include from about 1% to about 25%, by weight of the composition, of second polymer (b). The composition may include from about 1%, or from about 2%, or from about 3%, or from about 4%, or from about 5%, to about 25%, or to about 20%, or to about 15%, or to about 12%, or to about 11%, or to about 10%, by weight of the combination of first polymer (a), of second polymer (b), or of each of polymers (a) and (b).

Polymers (a) and (b) may be present in the composition in a weight ratio. The weight ratio may be from about from about 1:2 to about 8:1, or from about 1:1 to about 7:1, or from about 1:1 to about 5:1, or from about 1:1 to about 3:1, or from about 1:1 to about 2:1.

Polymers (a) and (b) are discussed in more detail below.

First Polymer (a)

The compositions of the present disclosure may include a first polymer (a), which may be a soil release polymer, also called "SRP" in the present disclosure. Suitable soil release polymers typically have hydrophilic segments to hydrophilize the surface of hydrophobic fibers, such as polyester and nylon, and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

Soil release polymers may include a variety of charged units (e.g., anionic or cationic units) and/or non-charged (e.g., nonionic) monomer units. The SRP may be a nonionic SRP (e.g., comprisonly nonionic monomer units and/or no anionic or cationic units). A nonionic SRP may be particularly preferred when the SRP is used in combination with a cationic fabric conditioning active, such as a quaternary ammonium ester compound, in order to avoid potentially negative interations between the SRP and the cationic active.

The structure of the soil release agent may be linear, branched, or star-shaped, preferably linear.

The soil release polymer may include a capping moiety, which is especially effective in controlling the molecular weight of the polymer or altering the physical or surface-active properties of the polymer. The structure and charge distribution of the soil release polymer may be tailored for application to different fibers or textile types and for formulation in different detergent or detergent additive products.

Suitable polyester soil release polymers may include a structure as defined by one of the following structures (I), (II) or (III):

(I)

(II)

(III)

wherein:
a, b and c are from 1 to 200;
d, e and f are from 1 to 50;
Ar is a 1,4-substituted phenylene;
sAr is 1,3-substituted phenylene substituted in position 5 with $SO_3M$;
M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
$R^1$, $R^2$, $R^3$, $R^4$, $R^5$ and $R^6$ are independently selected from H or $C_1$-$C_{18}$ n- or iso-alkyl; and
$R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable polyester soil release polymers may include terephthalate-derived polymers, which may include the structure (I) or (II) above. Suitable soil release polymers may include, for example sulphonated and unsulphonated PET/POET (polyethylene terephthalate/polyoxyethylene terephthalate) polymers, both end-capped and non-end-capped, preferably unsulphonated PET/POET polymers. Suitable soil release polymers may include sulphonated non-end-capped polyesters. Other suitable soil release polymers include methyl-capped ethoxylated propoxylated soil release polymers.

Examples of suitable polyester soil release polymers are the REPEL-O-TEX® line of polymers supplied by Rhodia, including REPEL-O-TEX® SF, SF-2, and SRP6. Other suitable soil release polymers include TexCare® polymers, including TexCare® SRA-100, SRA-300, SRN-100, SRN-170, SRN-240, SRN-260, SRN-300, and SRN-325, supplied by Clariant. Other suitable soil release polymers are Marloquest® polymers, such as Marloquest® SL, HSCB, L235M, B, and G82, supplied by Sasol.

Second Polymer (b)

The compositions of the present disclosure may include a second polymer (b), which may be a graft copolymer, an alkoxylated polyalkyleneimine polymer, or mixtures thereof. The composition may be substantially free of the graft copolymer, or it may be substantially free of the alkoxylated polyalkyleneimine polymer. The weight ratio of the graft copolymer to the alkoxylated polyalkyleneimine in the composition may be from about 1:10, or from about 2:10, or from about 5:10 or from about 7:10, or from about 9:10, or from about 1:1, to about 10:1, or to about 10:2, or to about 10:5, or to about 10:7, or to about 10:9; or to about 1:1.

Each type of second polymer (b) is discussed in more detail below.

i. Graft Copolymer

The compositions of the present disclosure may include a graft copolymer. The graft copolymer may be an amphiphilic graft copolymer. The graft copolymer may be based on (i) water-soluble polyalkylene oxides as a graft base and (ii) one or more side chains formed by polymerization of a vinyl ester component.

Water-soluble polyalkylene oxides suitable for forming the graft base (i) include polymers based on C2-C4-alkylene oxides. The graft bases may comprise at least 50% by weight, preferably at least 60% by weight, more preferably at least 75% by weight of alkylene oxide, preferably ethylene oxide, in copolymerized form. The graft base (i) may be polyethylene glycol or a derivative thereof.

The vinyl ester component (ii) may comprise, or even consist of, vinyl acetate, vinyl propionate, or mixtures thereof. The vinyl ester component (ii) may be vinyl acetate. The vinyl ester component (ii), such as vinyl acetate, may be at least partially hydrolyzed.

The graft copolymer may comprise (i) polyethylene glycol (PEG) as a graft base and (ii) vinyl acetate side chain(s). Such copolymer may be referred to as "PEG/VAc copolymers."

The graft copolymers may comprise (i) from 20 to 70% by weight of a water-soluble polyalkylene oxide as a graft base and (ii) one or more side chains formed by free-radical polymerization of from 30 to 80% by weight of a vinyl ester component composed of (ii.a) from 70 to 100% by weight of vinyl acetate and/or vinyl propionate and (ii.b) from 0 to 30% by weight of a further ethylenically unsaturated monomer in the presence of (A). The graft copolymers may comprise from 25 to 60% by weight of the graft base (i) and from 40 to 75% by weight of the vinyl ester component (ii), preferably wherein the relative weight % of (i) and (ii) add up to 100% by weight of the copolymer.

The amphiphilic graft copolymers may have a relatively low degree of branching (degree of grafting). The graft copolymer may comprise, on average, based on the reaction mixture obtained, about one or fewer graft sites per 50 ethylene oxide groups. The graft copolymer may comprise, on average, based on the reaction mixture obtained, at least about 0.05, or at least about 0.1, graft site per 50 ethylene oxide groups. The degree of branching can be determined, for example, by means of $^{13}C$ NMR spectroscopy from the integrals of the signals of the graft sites and the —CH2— groups of the polyalkylene oxide.

The mean molecular weight Mw of the preferred amphiphilic graft polymers may from 3000 to 100,000, preferably from 6000 to 45,000, and more preferably from 8000 to 30,000 Da.

A suitable graft copolymer is Sokalan HP22, available from BASF.

ii. Alkoxylated Polyalkyleneimine

The compositions of the present disclosure may include an alkoxylated polyalkyleneimine polymer. The alkxoylated polyalkylenimine may be linear, branched, or combinations thereof, preferably branched.

Typically, the alkoxylated polyalkyleneimine polymer comprises a polyalkyleneimine backbone. The polyalkyleneimine may comprise C2 alkyl groups, C3 alkyl groups, or mixtures thereof, preferably C2 alkyl groups. The alkoxylated polyalkyleneimine polymer may have a polyethyleneimine ("PEI") backbone.

The alkoxylated PEI may comprise a polyethyleneimine backbone having a weight average molecular weight of from about 400 to about 1000, or from about 500 to about 750, or from about 550 to about 650, or about 600, as determined prior to ethoxylation.

The PEI backbones of the polymers described herein, prior to alkoxylation, may have the general empirical formula:

where B represents a continuation of this structure by branching. In some aspects, n+m is equal to or greater than 8, or 10, or 12, or 14, or 18, or 22.

The alkoxylated polyalkyleneimine polymer comprises alkoxylated nitrogen groups. The alkoxylated polyalkyleneimine polymer may independently comprise, on average per alkoxylated nitrogen, up to about 50, or up to about 40, or up to about 35, or up to about 30, or up to about 25, or up to about 20, alkoxylate groups. The alkoxylated polyalkyleneimine polymer may independently comprise, on average per alkoxylated nitrogen, at least about 5, or at least about 10, or at least about 15, or at least about 20, alkoxylate groups.

The alkoxylated polyalkyleneimine polymer, preferably alkoxylated PEI, may comprise ethoxylate (EO) groups, propoxylate (PO) groups, or combinations thereof. The alkoxylated polyalkyleneimine polymer, preferably alkoxylated PEI, may comprise ethoxylate (EO) groups. The alkoxylated polyalkyleneimine polymer, preferably alkoxylated PEI, may be free of propoxylate (PO) groups.

The alkoxylated polyalkyleneimine polymer, preferably alkoxylated PEI, may comprise on average per alkoxylated nitrogen, about 1-50 ethoxylate (EO) groups and about 0-5 propoxylate (PO) groups. The alkoxylated polyalkyleneimine polymer, preferably alkoxylated PEI, may comprise on average per alkoxylated nitrogen, about 1-50 ethoxylate (EO) groups and is free of propoxylate (PO) groups. The alkoxylated polyalkyleneimine polymer, preferably alkoxylated PEI, may comprise on average per alkoxylated nitrogen, about 10-30 ethoxylate (EO) groups, preferably about 15-25 ethoxylate (EO) groups.

Suitable alkoxylated polyalkylenimine polymers may include propoxylated polyalkylenimine (e.g., PEI) polymers. The propoxylated polyalkylenimine (e.g., PEI) polymers may also be ethoxylated. The propoxylated polyalkylenimine (e.g., PEI) polymers may have inner polyethylene oxide blocks and outer polypropylene oxide blocks, the degree of ethoxylation and the degree of propoxylation not going above or below specific limiting values. The ratio of polyethylene blocks to polypropylene blocks (n/p) may be from about 0.6, or from about 0.8, or from about 1, to a maximum of about 10, or a maximum of about 5, or a maximum of about 3. The n/p ratio may be about 2. The propoxylated polyalkylenimines may have PEI backbones having molecular weights (prior to alkoxylation) of from about 200 g/mol to about 1200 g/mol, or from about 400 g/mol to about 800 g/mol, or about 600 g/mol. The molecular weight of the propoxylated polyalkylenimines may be from about 8,000 to about 20,000 g/mol, or from about 10,000 to about 15,000 g/mol, or about 12,000 g/mol.

Suitable propoxylated polyalkylenimine polymers may include compounds of the following structure:

where EOs are ethoxylate groups and POs are propoxylate groups. The compound shown above is a PEI where the molar ratio of EO:PO is 10:5 (e.g., 2:1). Other similar, suitable compounds may include EO and PO groups present in a molar ratio of about 10:5 or about 24:16.

Suitable polyamines include low molecular weight, water soluble, and lightly alkoxylated ethoxylated/propoxylated polyalkyleneamine polymers. By "lightly alkoxylated," it is meant the polymers of this invention average from about 0.5 to about 20, or from 0.5 to about 10, alkoxylations per nitrogen. The polyamines may be "substantially non-charged," meaning that there are no more than about 2 positive charges for every about 40 nitrogens present in the backbone of the polyalkyleneamine polymer at pH 10, or at pH 7; it is recognized, however, that the charge density of the polymers may vary with pH.

Suitable alkoxylated polyalkyleneimines, such as PEI600 EO20, are available from BASF (Ludwigshafen, Germany). Another suitable alkoxylated polyalkyleneimine is PEI600 EO24 PO16.

Additional Adjuncts

The fabric treatment compositions of the present disclosure may include additional adjunct ingredients. Such adjuncts may provide additional treatment benefits to the target fabrics, and/or they may act as stabilization or processing aids to the compositions. Suitable adjuncts may include chelant, perfume, structurant, chlorine scavenger, malodor reduction materials, organic solvents, or mixtures thereof.

The fabric treatment compositions of the present disclosure may include a chelant. Chelants may provide additional malodor control benefits. Additionally or alternatively, chelants may provide anti-encrustation benefits, for example by sequestering materials that might otherwise deposit onto fabrics. The composition may include from about 0.1% to about 10%, by weight of the composition, of a chelant. Suitable chelants may include phosphonates, aminocarboxylates, amino phosphonates, polyfunctionally-substituted aromatic chelating agents, or mixtures thereof, preferably aminocarboxylates. Specific suitable chelants may include DTPA (diethylenetriaminepentaacetic acid), HEDP (hydroxyethanediphosphonic acid), EDDS (ethylenediamine disuccinate (EDDS), DTPMP (diethylene triamine penta (methylene phosphonic acid)), EDTMP (ethylene diamine tetra(methylene phosphonic acid)), Tiron® (1,2-diydroxy-benzene-3,5-disulfonic acid), HPNO (2-pyridinol-N-oxide), MGDA (methylglycinediacetic acid), DETA (diethylenetriamine), TETA (triethylenetetraamine), TEPA (tretraethylenepentamine), any suitable derivative thereof, salts thereof, and mixtures thereof.

The fabric treatment compositions of the present disclosure may include perfume. Perfumes may improve the aesthetics of the composition, the treatment process, or the fabrics treated with the composition. The perfume may be neat perfume, encapsulated perfume, emulsified perfume, or mixtures thereof. Encapsulated perfume may be preferred for long-lasting scent benefits, as the encapsulates may rupture to release the perfume upon abrasion and/or movement, such as during an athletic endeavor.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs. Typical PRM comprise inter alia alcohols, ketones, aldehydes, esters, ethers, nitrites and alkenes, such as terpene.

The compositions may comprise from about 0.1% to about 10%, or from about 0.1% to about 5%, preferably from about 0.5% to about 4%, more preferably from about 1% to about 3%, by weight of the fabric treatment composition, of perfume. In some cases, it may be desirable for the composition to be relatively unscented. In such cases, no additional perfume is added, and the composition may comprise less than 0.1%, or even zero percent, of perfume.

The compositions may comprise encapsulated perfume. The encapsulated perfume may be formed by at least partially surrounding perfume materials with a wall material. The capsule wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, or mixtures thereof. The melamine wall material may comprise melamine crosslinked with formaldehyde, melamine-dimethoxyethanol crosslinked with formaldehyde, and mixtures thereof; encapsulates with such wall materials may be used in combination with a formaldehyde scavenger, such as acetoacetamide, urea, or derivatives thereof. The polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

The perfume capsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, a polysaccharide (e.g., chitosan), and combinations thereof.

One or more types of encapsulates, for examples two encapsulate types, wherein one of the first or second encapsulates (a) has a wall made of a different wall material than the other; (h) has a wall that includes a different amount of wall material or monomer than the other; or (c) contains a different amount perfume oil ingredient than the other; or (d) contains a different perfume oil, may be used. Encapsulates may be added to the composition as a slurry.

The fabric treatment compositions, of the present disclosure, particularly when the composition is in liquid form, may include an external structurant. It has been found that liquid fabric treatment compositions that include graft polymers according to the present disclosure may not be physically stable; for example, such compositions may phase separate. It has further been found that external structurants can provide physical stability to liquid compositions according to the present disclosure. External structurants may include non-polymeric crystalline, hydroxy-functional structurants and/or polymeric structurants.

Non-polymeric crystalline, hydroxyl functional structurants may comprise a crystallizable glyceride, which may be pre-emulsified to aid dispersion into the final detergent composition. Suitable crystallizable glycerides include hydrogenated castor oil or "HCO" or derivatives thereof, provided that it is capable of crystallizing in the liquid detergent composition.

Polymeric structurants may include naturally derived structurants and/or synthetic structurants. Naturally derived polymeric structurants include: hydroxyethyl cellulose, hydrophobically modified hydroxyethyl cellulose, carboxymethyl cellulose, polysaccharide derivatives and mixtures thereof. Suitable polysaccharide derivatives include: pectine, alginate, arabinogalactan (gum Arabic), carrageenan, gellan gum, xanthan gum, guar gum and mixtures thereof. The structurant may comprise cellulosic fibers, for example in the form of microfibrillated cellulose. Cellulose may be derived from bacterial, wood, or other plants such as fruit or sugar beet.

Synthetic polymeric structurants include: polycarboxylates, polyacrylates, hydrophobically modified ethoxylated urethanes, hydrophobically modified non-ionic polyols and mixtures thereof. The polycarboxylate polymer may be a polyacrylate, polymethacrylate or mixtures thereof. The polyacrylate may be a copolymer of unsaturated mono- or di-carbonic acid and $C_1$-$C_{30}$ alkyl ester of the (meth)acrylic acid. Such copolymers are available from Lubrizol Corp. under the tradename Carbopol® Aqua 30. Rheovis CDE (ex BASF) may also be suitable.

The fabric treatment compositions of the present disclosure may include a chlorine scavenger. Chlorine may be present in the water provided to form a treatment liquor, and resulting hypochloride ions may degrade elastic fibers, which are common in athletic wear garments. Suitable chlorine scavengers may include ammonium chloride, primary amines (such as monoethanolamine), and others known to those of ordinary skill in the art.

The fabric treatment composition of the present disclosure may include malodor reduction materials. Such materials are capable of decreasing or even eliminating the perception of one or more malodors. Suitable malodor reduction materials may include: 3-(3,3-dimethyl-2,3-dihydro-1H-inden-5-yl) propanal; 3-(6,6-dimethylbicyclo[3.1.1]hept-2-en-2-yl)-2,2-dimethylpropanal; 3-methyl-5-phenylpentan-1-ol; E)-3,7-dimethylocta-2,6-dien-1-yl palmitate; 3a,4,5,6,7,7a-hexahydro-4,7-methano-1H-inden-(5 and 6)-yl acetate; 3,4,4a,5,6,7,8,8a-octahydrochromen-2-one; 2,2,7,7-tetramethyltricyclo(6.2.1.0(1,6))-undecan-5-one; (E)-3,7-dimethylocta-1,3,6-triene; 1-((2-(tert-butyl)cyclohexyl)oxy) butan-2-ol; or combinations thereof. The malodor reduction materials may be encapsulated, for example in encapsulates that include melamine-formaldehyde wall materials.

The fabric treatment compositions of the present disclosure may include a fabric conditioning active ("FCA"). Compositions comprising such actives are useful for providing various benefits to target fabrics, including softness, anti-wrinkle, anti-static, conditioning, anti-stretch, color, and/or appearance benefits. The fabric treatment composition may include from about 1%, or from about 2%, or from about 3%, to about 30%, or to about 25%, or to about 20%, or to about 15%, or to about 10%, by weight of the composition, of FCA. The fabric treatment composition may include from about 5% to about 30%, by weight of the composition, of FCA.

Fabric conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof. The composition may include a quaternary ammonium ester compound, a silicone, or combinations thereof, preferably a combination.

The compositions of the present disclosure may comprise a quaternary ammonium ester compound as a fabric conditioning active. The quaternary ammonium ester compound (sometimes referred to as "ester quats") may be present at a level of from about 2% to about 40%, or from about 3% to about 25%, preferably from 4% to 18%, more preferably from 5% to 15%, by weight of the composition. The quaternary ammonium ester compound may be present at a level of from greater than 0% to about 30%, or from about 1% to about 25%, or from about 3% to about 20%, or from about 4.0% to 18%, more preferably from 4.5% to 15%, even more preferably from 5.0% to 12% by weight of the composition. The level of quaternary ammonium ester compound may depend of the desired concentration of total fabric conditioning active in the composition (diluted or concentrated composition) and of the presence or not of other FCAs. However, the risk on increasing viscosities over time is typically higher in fabric treatment compositions with higher FCA levels. On the other hand, at very high FCA levels, the viscosity may no longer be sufficiently controlled which renders the product unfit for use.

Preferably, the iodine value (IV) of the parent fatty acid from which the quaternary ammonium fabric compound is formed is from 0 to about 90, or from about 10 to about 70, or from about 15 to about 50, or from about 18 to about 30. The iodine value may be from about 25 to 50, preferably from 30 to 48, more preferably from 32 to 45.

Suitable quaternary ammonium ester compounds include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester compound.

The quaternary ammonium ester compound may comprise compounds of the following formula:

wherein:
m is 1, 2 or 3 with proviso that the value of each m is identical;
each $R^1$ is independently hydrocarbyl, or branched hydrocarbyl group, preferably $R^1$ is linear, more preferably $R^1$ is partially unsaturated linear alkyl chain;
each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl;
each X is independently —($CH_2$)n-, —$CH_2$—CH($CH_3$)— or —CH—($CH_3$)—$CH_2$— and
each n is independently 1, 2, 3 or 4, preferably each n is 2;
each Y is independently —O—(O)C— or —C(O)—O—;
A− is independently selected from the group consisting of chloride, methyl sulfate, and ethyl sulfate, preferably A− is selected from the group consisting of chloride and methyl sulfate, more preferably A− is methyl sulfate;
with the proviso that when Y is —O—(O)C—, the sum of carbons in each $R^1$ is from 13 to 21, preferably from 13 to 19. Preferably, X is —$CH_2$—CH($CH_3$)— or —CH—($CH_3$)—$CH_2$— to improve the hydrolytic stability of the quaternary ammonium ester compound, and hence further improve the stability of the fabric treatment composition.

Examples of suitable quaternary ammonium ester compound are commercially available from Evonik under the tradename Rewoquat WE18, Rewoquat WE20, from Stepan under the tradename Stepantex GA90, Stepantex VK90, Stepantex VL90A.

The fabric treatment composition may silicone as a fabric conditioning active. Suitable levels of silicone may comprise from about 0.1% to about 70%, or from about 0.3% to about 40%, or from about 0.5% to about 30%, alternatively from about 1% to about 20% by weight of the composition.

Useful silicones can be any silicone-comprising compound. The silicone polymer may be selected from the group consisting of cyclic silicones, polydimethylsiloxanes, aminosilicones, cationic silicones, silicone polyethers, silicone resins, silicone urethanes, and mixtures thereof. The silicone may comprise a polydialkylsilicone, such as a polydimethyl silicone (polydimethyl siloxane or "PDMS"), or a derivative thereof. The silicone may comprise an aminofunctional silicone, amino-polyether silicone, alkyloxylated silicone, cationic silicone, ethoxylated silicone, propoxylated silicone, ethoxylated/propoxylated silicone, quaternary silicone, or combinations thereof. The silicone may comprise a polydimethyl silicone, an aminosilicone, or a combination thereof, preferably an aminosilicone.

The silicone may comprise a random or blocky organosilicone polymer. The silicone may be provided as an emulsion.

The silicone may be characterized by a relatively high molecular weight. A suitable way to describe the molecular weight of a silicone includes describing its viscosity. A high molecular weight silicone may be one having a viscosity of from about 10 cSt to about 3,000,000 cSt, or from about 100 cSt to about 1,000,000 cSt, or from about 1,000 cSt to about 600,000 cSt, or even from about 6,000 cSt to about 300,000 cSt.

As shown in the examples below, the polymer systems of the present disclosure can provide relative wicking benefits in a composition that also includes a fabric conditioning active, such as a quaternary ammonium ester compound. However, the examples indicate that the polymer systems of the present disclosure may provide even better benefits when not used in combination with a fabric conditioning active. Furthermore, some garment manufacturers recommend that fabric softeners not be used in combination with certain garments, such as those that contain certain synthetic fibers. Therefore, it may be preferred that the compositions according to the present disclosure contain minimal, if any, amounts of fabric conditioning actives. For example, the compositions may include less than about 5%, or less than about 3%, or less than about 1%, or less than about 0.1%, or 0%, by weight of the composition, of a fabric conditioning active, such as those described above. The composition may be substantially free of fabric conditioning actives, such as quaternary ammonium ester compounds.

The compositions of the present disclosure may include an antioxidant. Without wishing to be bound by theory, it is believed that antioxidants may help to improve malodor control and/or cleaning performance of the compositions; malodor control may be particularly useful on synthetic fabrics and/or athletic wear, which can accumulate perspiration-based soils. Antioxidants are substances as described in Kirk-Othmer (Vol. 3, page 424) and in Ullmann's Encyclopedia (Vol. 3, page 91).

The compositions of the present disclosure may include an antioxidant, preferably a hindered phenol antioxidant, in an amount of from about 0.001% to about 2%, preferably from about 0.01% to about 0.5%, by weight of the composition.

Suitable antioxidants may include alkylated phenols, having the general formula:

wherein R is $C_1$-$C_{22}$ linear alkyl or $C_3$-$C_{22}$ branched alkyl, each (1) having optionally therein one or more ester (—$CO_2$—) or ether (—O—) links, and (2) optionally substituted by an organic group comprising an alkyleneoxy or polyalkyleneoxy group selected from EO (ethoxy), PO (propoxy), BO (butoxy), and mixtures thereof, more preferably from EO alone or from EO/PO mixtures; R may preferably be methyl, branched $C_3$-$C_6$ alkyl, or $C_1$-$C_6$ alkoxy, preferably methoxy; $R^1$ is a $C_3$-$C_6$ branched alkyl, preferably tert-butyl; x is 1 or 2.

Preferred types of alkylated phenols having this formula may include hindered phenolic compounds. As used herein, the term "hindered phenol" is used to refer to a compound comprising a phenol group with either (a) at least one $C_3$ or higher branched alkyl, preferably a $C_3$-$C_6$ branched alkyl, preferably tert-butyl, attached at a position ortho to at least one phenolic —OH group, or (b) substituents independently selected from the group consisting of a $C_1$-$C_6$ alkoxy, preferably methoxy, a $C_1$-$C_{22}$ linear alkyl or $C_3$-$C_{22}$ branched alkyl, preferably methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above. Where any R group in the structure above comprises three or more contiguous monomers, that antioxidant is defined herein as a "polymeric hindered phenol antioxidant." Compositions according to the present disclosure may include a hindered phenol antioxidant. A preferred hindered phenol antioxidant includes 3,5-di-tert-butyl-4-hydroxytoluene (BHT).

A further class of hindered phenol antioxidants that may be suitable for use in the composition is a benzofuran or benzopyran derivative having the formula:

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2$OH, or —$CH_2$A wherein A is a nitrogen-comprising unit, phenyl, or substituted phenyl. Preferred nitrogen-comprising A units include amino, pyrrolidino, piperidino, morpholino, piperazino, and mixtures thereof.

Suitable hindered phenol antioxidants may include: 2,6-bis(1,1-dimethylethyl)-4-methyl-phenol; 3,5-bis(1,1-dimethylethyl)-4-hydroxy-benzenepropanoic acid, methyl ester; 3,5-bis(1,1-dimethylethyl)-4-hydroxybenzenepropanoic acid, octadecyl ester; or mixtures thereof.

Commercially available antioxidants that may be suitable include BHT, RALOX 35™, (also known as Millishield PA 35 and/or 3,5-bis(1,1-dimethylethyl)-4-hydroxy-benzenepropanoic acid, methyl ester) and/or TINOGARD TS™ (3,5-bis(1,1-dimethylethyl)-4-hydroxybenzenepropanoic acid, octadecyl ester).

Additional antioxidants may be employed. Examples of suitable antioxidants for use in the composition include, but are not limited to, the group consisting of a-, b-, g-, d-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name RaluquinÔ by the company RaschigÔ. Other types of antioxidants that may be used in the composition are 6-hydroxy-2,5,7,8-tetramethylchroman-2-carboxylic acid (TroloxÔ) and 1,2-benzisothiazoline-3-one (Proxel GXLÔ). Antioxidants such as tocopherol sorbate, butylated hydroxyl benzoic acids and their salts, gallic acid and its alkyl esters, uric acid and its salts, sorbic acid and its salts, and dihydroxyfumaric acid and its salts may also be useful. Other useful antioxidants may include tannins, such as tannins selected from the group consisting of gallotannins, ellagitannins, complex tannins, condensed tannins, and combinations thereof.

The use of non-yellowing antioxidants, such as non-yellowing hindered phenol antioxidants, may be preferred. Antioxidants that form such yellow by-products may be avoided if they lead to perceptible negative attributes in the consumer experience (such as deposition of yellow by-products on fabric, for example). The skilled artisan is able to make informed decisions regarding the selection of antioxidants to employ.

The compositions of the present disclosure may include relatively little, if any, detersive surfactant, such as anionic surfactant. Without wishing to be bound by theory, it is believed that such surfactants may inhibit the wicking benefits of the present polymer system, for example by limiting the amount of SRP that deposits on the fabrics. The compositions may include less than about 5%, or less than about 3%, or less than about 1%, or less than about 0.1%, or 0%, by weight of the composition, of detersive surfactants, preferably anionic surfactants. The compositions may be substantially free of detersive surfactants, preferably substantially free of anionic surfactants. Anionic surfactants common in laundry products may include anionic sulphonate surfactants such as linear alkyl benzene sulphonate (LAS), sulfated surfactants such as alkoxylated and/or non-alkoxylated sulfate surfactants, or mixtures thereof. Anionic surfactants may be linear or branched. To note, although such surfactants may not be preferred in the present compositions, the present compositions may be used in combination, for example in a regimen, with such compositions.

Despite the foregoing paragraph, the compositions may include nonionic surfactant. Nonionic surfactants may aid, for example, with compositional stability and/or suds control. The compositions may comprise nonionic surfactant, if present, in amounts of from about 0.1% to about 10%, or from about 1% to about 10%, or from about 4% to about 10%, or from about 5% to about 10%, or from about 6% to about 10%, by weight of the composition. Suitable nonionic surfactants may include ethoxylated alcohols, such as those sold under the NEODOL® brand name.

The compositions of the present disclosure may include relatively little, if any, bleach or bleaching systems. Without wishing to be bound by theory, it is believed that bleach or bleaching systems may degrade the polymers of the present compositions. The compositions may include less than about 5%, or less than about 3%, or less than about 1%, or less than about 0.1%, or 0%, by weight of the composition, of bleach or a bleaching system. The compositions may be substantially free of bleach or a bleaching system. Bleaches may include photobleaches, bleach activators, hydrogen peroxide, sources of hydrogen peroxide, pre-formed peracids, hypochlorite-type bleaches, or mixtures thereof. The composition may also be substantially free of bleach catalysts, bleach activators (e.g, NOBS or TAED), and/or other ingredients that may be present in a bleaching system.

The compositions of the present disclosure may include relatively little, if any, carbonates, which may lead to undesirable encrustation on fabrics, particularly those that include elastic fibers. The compositions may include less than about 5%, or less than about 3%, or less than about 1%, or less than about 0.1%, or 0%, by weight of the composition, of carbonates, citrates, citric acid, or combinations thereof. The compositions may be substantially free of carbonates, citrates, citric acid, or combinations thereof.

The composition may include a suds suppressor or defoaming agent, such as a silicone, which may be useful, for example, as a processing aid.

Process of Treating a Fabric

The present disclosure relates to processes of treating a fabric with the polymer system of the present disclosure.

For example, the processes of the present disclosure may include contacting a fabric with a composition according to the present disclosure. The contacting may occur in the presence of water. The composition may be diluted and/or dissolved in the water to form a treatment liquor.

The processes of the present disclosure may include contacting a fabric with an aqueous treatment liquor. The aqueous treatment liquor may comprise from about 10 ppm, or from about 20 ppm, or from about 30 ppm, or from about 40 ppm, or from about 50 ppm, or from about 60 ppm, or from about 70 ppm, to about 200 ppm, or to about 150 ppm, or to about 120 ppm, or to about 100 ppm, or to about 90 ppm, of total polymer, determined as first polymer (a) plus second polymer (b). The aqueous treatment liquor may comprise from about 10 ppm, or from about 20 ppm, or from about 25 ppm, or from about 30 ppm, or from about 35 ppm, to about 100 ppm, or to about 80 ppm, or to about 60 ppm, or to about 50 ppm, or to about 45 ppm of first polymer (a), a soil release polymer, preferably a terephthalate-derived soil release polymer (SRP), as described in more detail above. The aqueous treatment liquor may comprise from about 10 ppm, or from about 20 ppm, or from about 25 ppm, or from about 30 ppm, or from about 35 ppm, to about 100 ppm, or to about 80 ppm, or to about 60 ppm, or to about 50 ppm, or to about 45 ppm of second polymer (b), which may be a graft copolymer, preferably a PEG/vinyl acetate graft copolymer, an alkoxylated polyalkyleneimine polymer, or mixtures thereof, as described in more detail above.

The process of treating a fabric may occur in any suitable vessel, for example an automatic washing machine. Such machines may be top-loading machines or front-loading machines.

The contacting step may be part of a rinse cycle of an automatic washing machine. The aqueous treatment liquor may be an aqueous rinse liquor. A composition according to the present disclosure may be added to the drum of an automatic washing machine during a rinse cycle.

The processes of the present disclosure may include contacting the fabric with an aqueous wash liquor. The step of contacting the fabric with an aqueous wash liquor may occur prior to contacting the fabric with an aqueous rinse liquor. Such steps may occur during a single treatment cycle. The aqueous wash liquor may comprise a detergent composition, such as a granular or liquid laundry detergent composition, that is dissolved or diluted in water. The detergent composition may include anionic surfactant. The aqueous wash liquor may comprise from about 50 to about 5000 ppm, or from about 100 to about 1000 ppm, anionic surfactant. Suitable anionic surfactants are described above.

The aqueous rinse liquor, preferably a first aqueous rinse liquor, may comprise less than about 500 ppm, or less than about 250 ppm, or less than about 100 ppm, anionic surfactant. It may be that no anionic surfactant is intentionally added to the aqueous rinse liquor. It may be that some anionic surfactant carries over from a wash cycle and/or an aqueous wash liquor to the rinse cycle and/or the aqueous rinse liquor.

The fabric treated may be a synthetic fabric. Suitable synthetic fabrics include polyester, acrylic, nylon, rayon, acetate, spandex, lastex, and/or orlon fabrics.

The fabric treated may include synthetic fibers. Suitable synthetic fibers may include polyester, acrylic, nylon, rayon, acetate, spandex, lastex, and/or orlon fibers. The fibers may be elastic and/or contain elastane. The fabric may contain blends of synthetic fibers and natural fibers (e.g., a polycotton blend). The fabric may comprise fibers that are relatively hydrophobic (for example, compared to cotton fibers).

Use of a Graft Copolymer

The present disclosure relates to the use of a graft copolymer and/or a polymer system that includes a graft copolymer and an SRP. For example, the present disclosure relates to the use of a PEG/vinyl acetate graft copolymer, optionally in combination with a terephthalate-derived soil release polymer (SRP), to improve or maintain wicking performance of a fabric after the fabric is treated with a composition comprising the copolymer and optionally the SRP, compared to treating the fabric with a similar composition that does not include the copolymer and optionally the SRP.

Any or all of the PEG/vinyl acetate graft copolymer, the terephthalate-derived soil release polymer (SRP), the composition, and/or the treatment process may be as described above.

Combinations

Specifically contemplated combinations of the disclosure are herein described in the following lettered paragraphs. These combinations are intended to be illustrative in nature and are not intended to be limiting.

A. A fabric treatment composition comprising: (a) from about 1% to about 25%, or from about 1% to about 20%, or from about 1% to about 15%, by weight of the composition, of first polymer, the first polymer being a soil release polymer (SRP); and (b) from about 1% to about 25%, or from about 1% to about 20%, or from about 1% to about 15%, by weight of the composition, of a second polymer, the second polymer being a graft copolymer, an alkoxylated polyalkyleneimine polymer, or a mixture thereof, wherein the graft copolymer, if present, comprises (i) water-soluble polyalkylene oxides as a graft base, and (ii) one or more side chains formed by polymerization of a vinyl ester component; wherein the composition comprises less than about 5%, by weight of the composition, of anionic surfactant.

B. A fabric treatment composition comprising: (a) a first polymer, the first polymer being a soil release polymer; and (b) a second polymer, the second polymer being a graft copolymer, an alkoxylated polyalkyleneimine, or mixtures thereof, wherein the graft copolymer, if present, comprises (i) water-soluble polyalkylene oxides as a graft base, and (ii) one or more side chains formed by polymerization of a vinyl ester component; wherein the total weight of (a)+(b) is from about 2% to about 30%, or from about 3% to about 30%, or from about 4% to about 30%, by weight of the composition.

C. A fabric treatment composition according to any of paragraphs A-B, wherein the weight ratio of (a) to (b) is from about 1:2 to about 8:1, or from about 1:1 to about 7:1, or from about 1:1 to about 5:1, or from about 1:1 to about 3:1, or from about 1:1 to about 2:1.

D. A fabric treatment composition according to any of paragraphs A-C, the composition comprising at least about 2%, or at least about 3%, or at least about 4%, or at least about 5%, or at least about 6%, or at least about 7%, or at least about 8%, or at least about 9%, or at least about 10%, by weight of the composition of polymer (a).

E. A fabric treatment composition according to any of paragraphs A-D, the composition comprising at least about 2%, or at least about 3%, or at least about 4%, or at least about 5%, or at least about 6%, or at least about 7%, or at least about 8%, or at least about 9%, or at least about 10%, by weight of the composition of polymer (b).

F. A fabric treatment composition according to any of paragraphs A-E, wherein the first polymer includes a structure according to (I), (II), or (III):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[(OCHR^5—CHR^6)_c—OR^7]_f \quad (III)$$

wherein: a, b and c are from 1 to 200; d, e and f are from 1 to 50; Ar is a 1,4-substituted phenylene; sAr is 1,3-substituted phenylene substituted in position 5 with $SO_3M$; M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof; $R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

G. A fabric treatment composition according to any of paragraphs A-F, wherein the first polymer is a terephthalate-derived soil release polymer, preferably a PET/POET soil release polymer.

H. A fabric treatment composition according to any of paragraphs A-G, wherein the first polymer is a nonionic SRP.

I. A fabric treatment composition according to any of paragraphs A-H, wherein the second polymer comprises a graft copolymer.

J. A fabric treatment composition according to any of paragraphs A-I, wherein the water-soluble polyalkylene oxides of the graft base comprise ethylene oxide.

K. A fabric treatment composition according to any of paragraphs A-J, wherein the vinyl ester component comprises vinyl acetate.

L. A fabric treatment composition according to any of paragraphs A-K, wherein the graft copolymer comprises from 25 to 60% by weight of the graft base (i) and from 40 to 75% by weight of the vinyl ester component (ii).

M. A fabric treatment composition according to any of paragraphs A-L, wherein the graft copolymer comprises about one or fewer graft sites per 50 ethylene oxide groups.

N. A fabric treatment composition according to any of paragraphs A-M, wherein the second polymer comprises an alkoxylated polyalkyleneime polymer.

O. A fabric treatment composition according to any of paragraphs A-N, wherein the alkoxylated polyalkyleneimine comprises ethoxylate (EO) groups, propoxylate (PO) groups, or combinations thereof.

P. A fabric treatment composition according to any of paragraphs A-O, wherein the alkoxylated polyalkyleneimine comprises ethoxylate (EO) groups.

Q. A fabric treatment composition according to any of paragraphs A-P, wherein the alkoxylated polyalkyleneimine comprises, on average per alkoxylated nitrogen, about 1-50 ethoxylate (EO) groups and about 0-5 propoxylate (PO) groups.

R. A fabric treatment composition according to any of paragraphs A-Q, wherein the alkoxylated polyalkyleneimine comprises, on average per alkoxylated nitrogen, about 1-50 ethoxylate (EO) groups and is free of propoxylate (PO) groups.

S. A fabric treatment composition according to any of paragraphs A-R, wherein the alkoxylated polyalkyleneimine comprises, on average per alkoxylated nitrogen, about 10-30 ethoxylate (EO) groups, preferably about 15-25 ethoxylate (EO) groups.

T. A fabric treatment composition according to any of paragraphs A-S, wherein the alkoxylated polyalkyleneimine is an alkoxylated polyethyleneimine (PEI).

U. A fabric treatment composition according to any of paragraphs A-T, wherein the alkoxylated polyalkyleneimine comprises a polyethyleneimine backbone having a weight average molecular weight of from about 400 to about 1000, or from about 500 to about 750, or from about 550 to about 650, or about 600, as determined prior to ethoxylation.

U2. A fabric treatment composition according to any of paragraphs A-U, wherein the composition comprises an antioxidant, preferably a hindered phenol antioxidant, preferably in an amount of from about 0.001% to about 2%, more preferably from about 0.01% to about 0.5%, by weight of the composition, even more preferably wherein the antioxidant comprises (a) 3,5-bis(1,1-dimethylethyl)-4-hydroxy-benzenepropanoic acid, methyl ester, (b) 3,5-bis(1,1-dimethylethyl)-4-hydroxybenzenepropanoic acid, octadecyl ester, or (c) mixtures thereof.

V. A fabric treatment composition according to any of paragraphs A-U2, the composition further comprising from about 0.1% to about 10%, by weight of the composition, of a chelant.

W. A fabric treatment composition according to any of paragraphs A-V, the composition further comprising from about 0.1% to about 10%, by weight of the composition, of perfume, preferably neat perfume, encapsulated perfume, emulsified perfume, or a combination thereof.

X. A fabric treatment composition according to any of paragraphs A-W, the composition further comprising a structurant.

Y. A fabric treatment composition according to any of paragraphs A-X, the composition further comprising a chlorine scavenger.

Z. A fabric treatment composition according to any of paragraphs A-Y, the composition further comprising a malodor reduction material selected from: 3-(3,3-dimethyl-2,3-dihydro-1H-inden-5-yl)propanal; 3-(6,6-dimethylbicyclo[3.1.1]hept-2-en-2-yl)-2,2-dimethylpropanal; 3-methyl-5-phenylpentan-1-ol; E)-3,7-dimethylocta-2,6-dien-1-yl palmitate; 3a,4,5,6,7,7a-hexahydro-4,7-methano-1H-inden-(5 and 6)-yl acetate; 3,4,4a,5,6,7,8,8a-octahydrochromen-2-one; 2,2,7,7-tetramethyltricyclo(6.2.1.0(1,6))-undecan-5-one; (E)-3,7-dimethylocta-1,3,6-triene; 1-((2-(tert-butyl)cyclohexyl)oxy)butan-2-ol; or combinations thereof.

AA. A fabric treatment composition according to any of paragraphs A-Z, the composition further comprising a fabric conditioning active, preferably a quaternary ammonium ester compound, a silicone, or mixtures thereof.

BB. A fabric treatment composition according to any of paragraphs A-AA, the composition comprising less than about 5%, or less than about 3%, or less than about 1%, or less than about 0.1%, or 0%, by weight of the composition, of anionic surfactant, a fabric conditioning active, bleach, carbonates, or combinations thereof.

CC. A fabric treatment composition according to any of paragraphs A-BB, wherein the composition is a liquid, preferably a liquid having a pH of from about 2 to about 7, or from about 3 to about 6, or from about 4 to about 5.

DD. A process of treating a fabric, the process comprising the steps of: contacting a fabric with an aqueous treatment liquor, the aqueous treatment liquor comprising from about 10 to about 100 ppm of a PEG/vinyl acetate graft copolymer, and from about 10 to about 100 ppm of a terephthalate-derived soil release polymer.

EE. A process according to paragraph DD, wherein the aqueous treatment liquor is an aqueous rinse liquor in an automatic washing machine.

FF. A process according to any of paragraphs DD-EE, wherein the process further comprises contacting the fabric with an aqueous wash liquor, the aqueous wash liquor comprising a detergent composition dissolved or diluted in water, the detergent composition comprising anionic surfactant, optionally wherein the aqueous wash liquor comprises from about 50 to about 5000 ppm, preferably from about 100 to about 1000 ppm, anionic surfactant, wherein during the process, the fabric is contacted with the aqueous wash liquor prior to being contacted with the aqueous rinse liquor as part of a single treatment cycle.

GG. A process according to any of paragraphs DD-FF, wherein the aqueous rinse liquor, preferably a first aqueous rinse liquor, comprises less than about 500 ppm, or less than about 250 ppm, or less than about 100 ppm, anionic surfactant.

HH. A process according to any of paragraphs DD-GG, wherein the fabric comprises synthetic fibers, preferably synthetic fibers selected from polyester, acrylic, nylon, rayon, acetate, spandex, lastex, or orlon fibers, or combinations thereof.

II. A process of treating a fabric, the process comprising the steps of: contacting a fabric with a composition according to any of paragraphs A-CC, optionally in the presence of water where the composition and the water form an aqueous treatment liquor.

JJ. Use of a PEG/vinyl acetate graft copolymer, optionally in combination with a terephthalate-derived soil release polymer, to improve or maintain wicking performance of a fabric after the fabric is treated with a composition comprising the copolymer compared to treating the fabric with a similar composition that does not include the copolymer.

Test Methods

Fabric Treatment Method

Fabric swatches are treated, optionally with a test composition, according to the following method. In general, the swatches undergo four treatment cycles, each featuring treatment with detergent in a wash cycle and a test composition (if any) in a rinse cycle. A soil load is added before the fourth treatment cycle.

Materials and Equipment

For each test leg, four doses (5.64 g) of liquid detergent Kirkland Signature Ultra Clean Premium Laundry Detergent ("detergent") are pre-weighed in plastic cups. A five-drum Automatic Miniwasher (AMW) manufactured by Anderson Tool & Engineering, or equivalent is used for treating the fabric swatches. The drums are cleaned prior to use by running them through a wash cycle, empty (without fabric swatches or detergent) with soft water at 60° C. (140° F.). This cleaning procedure is conducted between each complete wash/rinse cycle.

The fabric swatches of interest are eight weft knit, 95% Polyester 5% Spandex swatches, 8"×8" from WFK Test Materials. The remainder of the fabric bundle is comprised of jersey knit material to bring the bundle fiber composition to 80 wt % synthetic fibers (e.g., nylon, polyester, elastane), 20 wt % cotton fibers, so that the bundle in total is approx. 300 g.

Pre-Conditioning (Wash/Rinse×3)

To pre-condition the fabric swatches/specimens, the automatic miniwasher drum is filled with 2 gallons of 30° C. (86° F.) water, with 7 gpg water hardness. One dose of pre-weighed detergent is emptied into the drum and is pre-dispersed with agitation for 45 seconds. The fabric swatches are added to the drum and are agitated at 80 rpm for 12 minutes followed by a 2 minute high-spin cycle. After the wash/spin cycle has completed, the wet fabric swatches are temporarily removed from the drum.

The drum is filled with 2 gallons of 15.6° C. (60° F.) water, with 7 gpg water hardness. One dose of pre-weighed test composition is emptied into the drum at the indicated level (if any) and is pre-dispersed with agitation for 45 seconds. The fabric swatches are added back into the drum and are agitated at 80 rpm for 2 minutes followed by a 2 minute high-spin cycle. A Whirlpool Dryer Model: LER3622PQ2 is used to dry the fabric swatches for 35 minutes. This wash/rinse cycle is repeated two additional times with the same fabric swatches for a total of three pre-conditioning wash/rinse cycles.

Fourth (Final) Cycle

To soil the pre-conditioned fabric swatches, four pieces of soiled ballast fabric (e.g., WFK Soil Ballast W-SBL-2004, code 10996) are cut in half and set aside. An automatic miniwasher drum is filled with 2 gallons of 30° C. (86° F.) water, with 7 gpg water hardness. The fourth sample of pre-weighed detergent is emptied into the drum and is pre-dispersed with agitation for 45 seconds. Seven soiled ballast halves are added to the drum and are agitated at 80 rpm for 2 minutes. Agitation is stopped after the time has elapsed.

The fabric swatches are added to the drum. The bundle is agitated at 100 rpm for 20 minutes followed by a 2 minute high-spin cycle. After the wash/spin cycle has completed, the soiled ballast halves are removed and discarded. The wet fabric swatches are temporarily removed from the drum.

The drum is filled with 2 gallons of 15.6° C. (60° F.) water, with 7 gpg water hardness. The pre-weighed test composition is emptied into the drum and is pre-dispersed with agitation for 45 seconds. The fabric swatches are added back into the drum and are agitated at 80 rpm for 2 minutes followed by a 2 minute high-spin cycle. A Whirlpool Dryer Model: LER3622PQ2, or equivalent is used to dry the fabric swatches for 35 minutes.

After treatment, the fabric swatches may cut into specimens and tested for Wicking Distance, according to the following method.

Specimen Preparation

Specimens of fabric are prepared by using a pneumatic press (e.g., Atom SE20C pneumatic press) to cut fabric swatches (new or treated) into 18 cm×2.5 cm strips. From some swatches, specimens are cut with the long dimension in the vertical wale (loops on top) direction; other swatches are cut with the long dimension in the horizontal course (loops on side) direction. Only one specimen per swatch is used for a given treatment, and a total of eight fabric specimens are used per treatment (four cut in the vertical wale direction, four cut in the horizontal course direction). The "front" and "back" sides of the fabrics are noted and/or marked. The specimens should be handled with gloves and/or stored in plastic bags until time for conditioning and/or testing.

Prior to testing, the fabric specimens are equilibrated by storing the samples at 21.1° C. (70° F.) and 50% Relative Humidity for at least twelve hours to ensure the test specimens are in equilibrium with the specified conditions.

Determination of Wicking Distance

The following method is used to determine the Wicking Distance as measured on a fabric treated by a given composition. The method is based on AATCC ASTM Method 197-2013, Vertical Wicking of Textiles.

To determine the wicking distance of a fabric, 2000.00 g of distilled water and 0.50 g of a dye (Liquitint Green 101 Dye) are added to a 4 L beaker. The mixture is stirred until homogenous (about 30 seconds).

Two multi-specimen tubs are provided. Each tub includes four rulers attached to a back wall of the tub and oriented in the vertical direction, with the 0.0 cm markings nearest to, though not touching, the bottom of the tub. The water-dye mixture is poured into each tub to the 0.0 cm markings on the rulers. One tub is used for the four specimens cut in the vertical wale direction, and the other tub is used for the four specimens cut in the horizontal course direction.

Hang each specimen with a small binder clip on the back wall of the tub next to a ruler; the front of the fabric specimen should face away from the tub wall. The bottom edge of each test specimen should just touch the top surface of the dyed water; no more than about 1 mm of a specimen should be in the water at the start of the test. Start the timer as soon as the specimen comes into contact with the dyed water. If the end of the fabric specimen tends to float on the top of the water, a metal spatula may be used to lightly push the end of the specimen down into the water.

Observe to see if the dyed water rises/wicks up the specimen. Do not disturb the samples during the test. The vertical distance that the water travels up the specimen (measured in centimeters) may be determined at a desired time interval (e.g, T=20 minutes), or intervals (e.g., 1, 3, 5, 7, 9, 10, 15, 20, 25, and/or 30 minutes). To measure the distance traveled by the water as it wicks up the fabric specimen, look horizontally at the test specimen and read the distance (in cm) traveled by the dyed water on its corresponding ruler. Record the results. If the water level on the specimen is not horizontal at the time of recordation, estimate an average distance.

Figure 1:
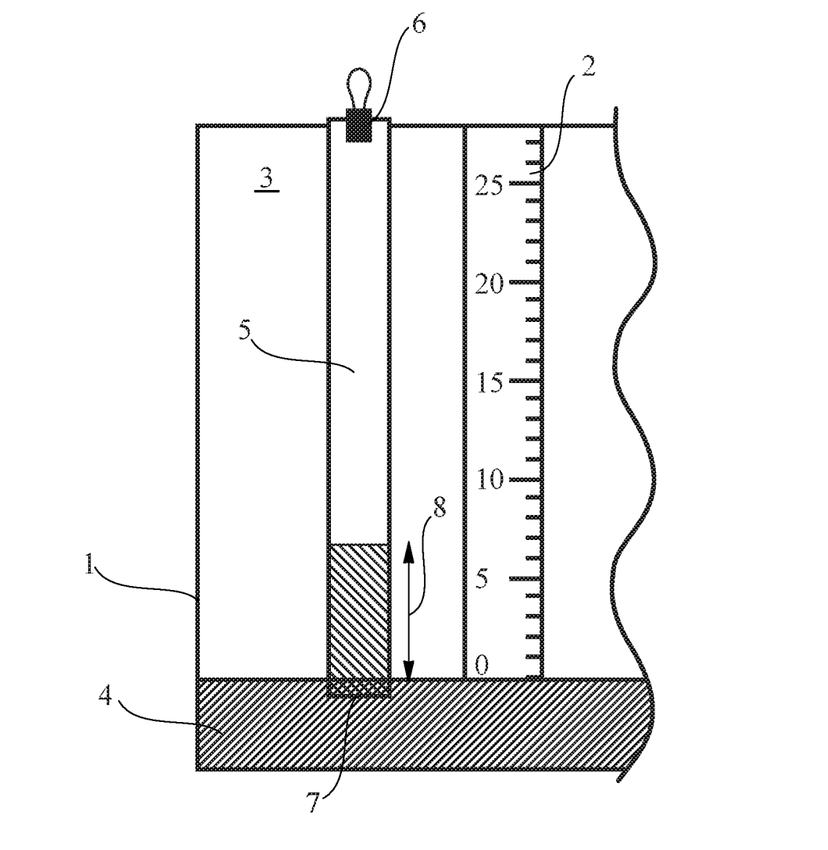
FIG. 1 shows a portion of the "Determination of Wicking Distance" experimental set-up.

FIG. 1 shows a simplified (not-to-scale) portion of the experimental set-up. A multi-specimen tub 1 is provided. A ruler 2 is attached to a back wall 3 of the tub 1. Dyed water 4 is provided to the tub 1. A fabric specimen 5 is attached with a clip 6 to or near the rear wall 3 of the tub 1; the specimen 5 may be spaced away from the rear wall 3. The bottom edge 7 of the specimen 5 is just touching the dyed water 4. The vertical distance 8 traveled by the dyed water 4 up the fabric specimen 5 may be determined by comparing to the ruler 2.

For the given time interval(s), record the distance traveled in centimeters. The test is considered complete (a) when the water has been transported 15.0 cm, or (b) when 30 minutes has elapsed, whichever occurs first. Replace the dyed water before starting the next test leg.

Wicking Distance for a given treatment is reported as the average vertical distance traveled by the water on the eight specimens for the given interval (e.g., 20 minutes). Wicking rates may also be determined if desired (e.g., cm/min or mm/s). Additionally or alternatively, results may be reported as the time to travel a particular distance (e.g., number of minutes for 10.0 cm traveled).

EXAMPLES

The examples provided below are intended to be illustrative in nature and are not intended to be limiting.

In each of Examples 1-3, polymer (a) is a nonionic soil release polymer (Texcare® SRN260, ex Clariant), and polymer (b) is an amphiphilic graft copolymer (vinyl acetate monomers grafted to a polyethylene glycol backbone, ex BASF).

Example 1. Wicking Performance

The following test is run to compare the wicking performance provided by polymer systems according to the present disclosure to other compositions. The tested compositions do not include a fabric conditioning active.

In example 1, Polymers (a) and/or (b) are dosed directly into the machine at levels sufficient to provide the given ppm's (parts per million).

TABLE 1

| Treatment | Polymer (a) (SRP) | Polymer (b) (graft copol.) | Wicking Distance (in cm) | Std. Dev. |
|---|---|---|---|---|
| New Fabric | — | — | 14.5 | 0.4 |
| 1 | — | — | 0.2 | 0.3 |
| 2 | 80 ppm | — | 11.9 | 1.3 |
| 3 | — | 80 ppm | 12.3 | 1.1 |
| 4 | 40 ppm | 40 ppm | 14.8 | 0.4 |

The results in Table 1 show that fabrics treated with a composition having a combination of Polymers (a) and (b) (e.g., Composition 4) provides improved wicking performance compared to fabrics treated with compositions having one polymer or the other at equivalent levels. Notably, fabrics treated with Composition 4 show a wicking performance that is approximately the same or better as a new (untreated) fabric.

Example 2. Wicking Performance in Presence of a Fabric Conditioning Active

The following tests are run to test the wicking performance of polymer systems according to the present disclosure in the presence of a fabric conditioning active (a quaternary ammonium ester quat). The tested compositions of Tables 2A and 2B have different total amounts of Polymer (a)+(b). The FCA, Polymer (a), and Polymer (b) are provided directly to the machine; the % levels given approximate the relative amounts (pro-rated) that would be present in a 25.5 g dose of a test composition as provided to a full-sized automatic washing machine ("equivalent polymer amount").

In Table 2A, the compositions of Examples 2A-4A have a total equivalent polymer amount (a+b) of 15 wt %.

TABLE 2A

| Treatment | Fabric Conditioning Active | Polymer (a) (SRP) | Polymer (b) (graft copol.) | Wicking Distance (in cm) | Std. Dev. |
|---|---|---|---|---|---|
| New Fabric | — | — | — | 14.5 | 0.4 |
| 1A | 3.6 wt % | — | — | 0.0 | 0.0 |
| 2A | 3.6 wt % | 15 wt % | — | 8.3 | 0.8 |
| 3A | 3.6 wt % | — | 15 wt % | 8.0 | 0.8 |
| 4A | 3.6 wt % | 7.5 wt % | 7.5 wt % | 9.3 | 0.9 |

In Table 2B, the compositions of Examples 2B-3B have a total equivalent polymer amount (a+b) of 4 wt %.

TABLE 2B

| Treatment | Fabric Conditioning Active | Polymer (a) (SRP) | Polymer (b) (graft copol.) | Wicking Distance (in cm) | Std. Dev. |
|---|---|---|---|---|---|
| New Fabric | — | — | — | 14.5 | 0.4 |
| 1B | 3.6 wt % | — | — | 0.0 | 0.0 |
| 2B | 3.6 wt % | 4 wt % | — | 4.5 | 1.4 |
| 3B | 3.6 wt % | 2 wt % | 2 wt % | 7.1 | 1.1 |

As shown by the results in Tables 2A and 2B, fabrics treated with a composition that includes a combination of polymers according to the present disclosure (e.g., Compositions 4A and 3B) show improved wicking performance compared to fabrics treated by a composition having only one polymer at an equivalent level.

Example 3. Polymer System Ratios

The following test is run to compare the performance of various ratios of Polymers (a) and (b).

The FCA, Polymer (a), and Polymer (b) are provided directly to the machine; the % levels given approximate the relative amounts (pro-rated) that would be present in a 25.5 g dose of a test composition as provided to a full-sized automatic washing machine ("equivalent polymer amount"). The rinse treatment includes 3.6% (equivalent) Fabric Conditioning Active (quaternary ammonium ester quat) and 15 wt % of a total equivalent polymer amount.

TABLE 3

| Treatment | Polymer Wt. Ratio (a):(b) | Wicking Distance (in cm) | Std. Dev. |
|---|---|---|---|
| 1 | 0:1 | 8.0 | 0.8 |
| 2 | 1:7 | 12.2 | 0.8 |

TABLE 3-continued

| Treatment | Polymer Wt. Ratio (a):(b) | Wicking Distance (in cm) | Std. Dev. |
|---|---|---|---|
| 3 | 1:3 | 12.1 | 0.6 |
| 4 | 1:1 | 13.9 | 0.9 |
| 5 | 3:1 | 13.2 | 1.2 |
| 6 | 7:1 | 13.4 | 0.5 |
| 7 | 1:0 | 10.1 | 0.9 |

As shown in Table 3, fabrics treated with compositions that include combinations of Polymers (a) and (b) (e.g., Compositions 2-6) show improved wicking performance compared to fabrics treated with compositions that include only one of the polymers (e.g., Compositions 1 and 7). In particular, polymer weight ratios (a:b) from about 1:1 to about 7:1 (e.g., Compositions, 4, 5, and 6) provided the most improved wicking performance.

Example 4. Polymer System+Antioxidant

The following test is run to show the effect of adding an antioxidant to compositions that include the presently described polymer systems.

A. Preparation of Malodor Composition

The specified amount of each material according to Table 4A is provided into a 200 mL glass jar with Teflon lined cap. Artificial body soil (ABS) is commercially available by Accurate Product Development; 2028 Bohlke Blvd, Fairfield, Ohio 45014.

TABLE 4A

Body soil malodor composition

| Material | Weight (g) |
|---|---|
| Malodor marker mixture (isovaleric, decanoic, undecanoic acids, ethyl undecanoate, undecanal and skatole) | 17.1 |
| Artificial Body Soil (ABS) | 15.8 |
| Di-propylene glycol monomethyl ether (CAS 34590-94-8) | 105 |
| Squalene (CAS # 111-02-4) | 15.8 |

B. Preparation of Malodor Test Fabrics

Sixteen malodor test fabrics per wash load are prepared by applying 300 μl of Body soil malodor composition described in Table 4 to de-sized 2×5 inch white polycotton 50/50 (PCW50/50) swatches. The fabrics are washed in one of the below treatments 1D or 2D (see Table 4B) and dried.

C. Analytical Detection of Malodor on Fabric

The treated fabrics are cut into uniform 2-inch by 2.5-inch pieces and placed in 10 mL headspace crimp vials. Vials are equilibrated greater than 12 hours before analysis. The malodor reduction using ABS/Squalene malodor sensors are quantitatively determined by Gas Chromatography Mass Spectroscopy using an Agilent gas chromatograph 7890B equipped with a mass selective detector (5977B), a Chemstation quantitation package and a Gerstel multi-purpose sampler equipped with a solid phase micro-extraction (SPME) probe. The total nMol/L liter of 6-Methyl-5-hepten-2-one (CAS 110-93-0), Trans-2-heptenal (18829-55-5) and 3-methyl-2-Butenal (107-86-8) are calculated based on calibration standards for each material and summed to provide the Total ABS/Squalene Markers (nmoles/L) for a given test leg.

D. Results

Results are provided in Table 4B.

TABLE 4B

Treatment Compositions and Analytical Results

| Ingredient | Treatment 1D | Treatment 2D |
|---|---|---|
| Polymer (a) | 40 ppm | 40 ppm |
| Polymer (b) | 40 ppm | 40 ppm |
| Chelant (diethylenetriamine) | 1.45 ppm | 1.45 ppm |
| Perfume | 9 ppm | 9 ppm |
| Antioxidant (RALOX 35 ™) | (none) | 0.4 ppm |
| Analytical markers[1] (nMol/L headspace, as a mean) | 95.9 | 18.2* |

[1]aldehydes/ketones from ABS/squalene oxidation
*significant over the result of Treatment 1D As shown from the results in Table 4B, the presence of an antioxidant in compositions/processes according to the present disclosure reduces the amount of certain oxidation analytical markers. It is believed that such results correlate with improved malodor control performance.

Example 5. Illustrative Formulations

Illustrative formulations of compositions according to the present disclosure are provided in the table below. Ingredient levels are provided as weight %, by weight of the composition. In addition to the formulations, the total amount of Polymers (a)+(b), as well as the weight ratio of Polymer (a) to Polymer (b), is provided.

TABLE 5

| Ingredient | 1 | 2 | 3 | 4 | 5 | 6 | 7 | 8 | 9 |
|---|---|---|---|---|---|---|---|---|---|
| Polymer (a)[1] | 10.10 | 2.00 | 2.00 | 15.14 | 20.19 | 7.57 | 8.83 | 5.05 | 2.52 |
| Polymer (b)[2] | 10.10 | 2.00 | 2.00 | 5.05 | 2.52 | 2.52 | 1.26 | 15.14 | 20.19 |
| Fabric Conditioning Active[3] | 0.00 | 0.00 | 3.60 | 0.00 | 0.00 | 0.00 | 0.00 | 0.00 | 0.00 |
| Solvent[4] | 2.60 | 2.60 | 2.60 | 2.60 | 2.60 | 2.60 | 2.60 | 2.60 | 2.60 |
| Perfume Oil | 1.30 | 1.30 | 1.30 | 1.30 | 1.30 | 1.30 | 1.30 | 1.30 | 1.30 |
| Surfactant[5] | 1.00 | 1.00 | 1.00 | 1.00 | 1.00 | 1.00 | 1.00 | 1.00 | 1.00 |
| Chelant | 3.79 | 1.00 | 3.79 | 3.79 | 3.79 | 3.79 | 3.79 | 3.79 | 3.79 |
| Chlorine Scavenger | 1.18 | 0.30 | 1.18 | 1.18 | 1.18 | 1.18 | 1.18 | 1.18 | 1.18 |
| Encapsulated Perfume[6] | 0.13 | 0.25 | 0.13 | 0.13 | 0.13 | 0.13 | 0.13 | 0.13 | 0.13 |
| Malodor reduction materials (encapsulated) | 0.05 | 0.00 | 0.05 | 0.05 | 0.05 | 0.05 | 0.05 | 0.05 | 0.05 |

TABLE 5-continued

| Ingredient | 1 | 2 | 3 | 4 | 5 | 6 | 7 | 8 | 9 |
|---|---|---|---|---|---|---|---|---|---|
| Acidulant | 0.05 | 0.05 | 0.05 | 0.05 | 0.05 | 0.05 | 0.05 | 0.05 | 0.05 |
| Preservative | 0.0006 | 0.0006 | 0.0006 | 0.0006 | 0.0006 | 0.0006 | 0.0006 | 0.0006 | 0.0006 |
| Structurant pre-mix[7] | 4.00 | 4.00 | 4.00 | 4.00 | 4.00 | 4.00 | 4.00 | 4.00 | 4.00 |
| DI Water | 65.71 | 85.50 | 78.31 | 65.72 | 63.20 | 75.82 | 75.82 | 65.72 | 63.20 |
| Total Polymer (a + b) | 20.20 | 4.00 | 4.00 | 20.19 | 22.71 | 10.09 | 9.99 | 20.19 | 22.71 |
| Polymer wt. ratio (a:b) | 1:1 | 1:1 | 1:1 | 3:1 | 7:1 | 3:1 | 7:1 | 1:3 | 1:7 |

[1] Polymer (a): nonionic SRP (e.g., Texcare ® SRN240 or SRN 260)
[2] Polymer (b): PEG/polyvinyl acetate graft copolymer (e.g., with the weight ratio of PEG:polyvinyl acetate of about 40:60)
[3] Fabric conditioning active: quaternary ammonium ester quat
[4] Solvent: e.g., glycerol, propylene glycol
[5] Surfactant: nonionic surfactant (ethoxylated alcohol)
[6] Encapsulated perfume: core-in-shell encapsulate, including melamine-formaldehyde wall material and a polyvinyl formamide coating (as deposition aid) on the wall
[7] Structurant pre-mix: contains crystallized hydrogenated castor oil The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric treatment composition comprising:
   (a) from about 1% to about 25%, by weight of the composition, of a first polymer, the first polymer being a terephthalate-derived soil release polymer (SRP); and
   (b) from about 1% to about 25%, by weight of the composition, of a second polymer, the second polymer being a graft copolymer,
   wherein the graft copolymer comprises
   i) water-soluble polyalkylene oxides as a graft base, and
   ii) one or more side chains formed by polymerization of a vinyl ester component,
   wherein the graft copolymer comprises from 25 to 60% by weight of the graft base (i) and from 40 to 75% by weight of the vinyl ester component (ii);
   wherein the composition comprises less than about 5%, by weight of the composition, of anionic surfactant;
   wherein the composition is in the form of a liquid.

2. A fabric treatment composition according to claim 1, wherein the weight ratio of (a) to (b) is from about 1:2 to about 8:1.

3. A fabric treatment composition according to claim 1, the composition comprising
   at least about 2% by weight of the composition of the first polymer, and/or
   at least about 2% by weight of the composition of the second polymer.

4. A fabric treatment composition according to claim 1, wherein the first polymer is a nonionic SRP.

5. A fabric treatment composition according to claim 1, wherein the water-soluble polyalkylene oxides of the graft base comprise ethylene oxide, and/or wherein the vinyl ester component comprises vinyl acetate.

6. A fabric treatment composition according to claim 1, wherein the graft copolymer comprises about one or fewer graft sites per 50 ethylene oxide groups.

7. A fabric treatment composition according to claim 1, wherein the fabric treatment composition further comprises an alkoxylated polyalkyleneime polymer comprising ethoxylate (EO) groups, propoxylate (PO) groups, or combinations thereof.

8. A fabric treatment composition according to claim 1, wherein the composition further comprises an antioxidant.

9. A fabric treatment composition according to claim 1, the composition further comprising from about 0.1% to about 10%, by weight of the composition, of a chelant.

10. A fabric treatment composition according to claim 1, the composition further comprising from about 0.1% to about 10%, by weight of the composition, of perfume.

11. A fabric treatment composition according to claim 1, the composition further comprising a structurant.

12. A fabric treatment composition according to claim 1, the composition further comprising a chlorine scavenger.

13. A fabric treatment composition according to claim 1, the composition further comprising a fabric conditioning active.

14. A fabric treatment composition according to claim 1, the composition comprising less than about 3%, by weight of the composition, of anionic surfactant, a fabric conditioning active, bleach, carbonates, or combinations thereof.

15. A fabric treatment composition comprising:
   (a) a first polymer, the first polymer being a terephthalate-derived soil release polymer; and
   (b) a second polymer, the second polymer being a graft copolymer, wherein the graft copolymer comprises
  i) water-soluble polyalkylene oxides as a graft base, and
  ii) one or more side chains formed by polymerization of a vinyl ester component,
  wherein the graft copolymer comprises from 25 to 60% by weight of the graft base (i) and from 40 to 75% by weight of the vinyl ester component (ii);
wherein the total weight of (a)+(b) is from about 2% to about 30% by weight of the composition;
wherein the composition comprises less than about 5%, by weight of the composition, of anionic surfactant;
wherein the composition is in the form of a liquid.

16. A fabric treatment composition according to claim 8, wherein the antioxidant is a hindered phenol antioxidant that is present in an amount of from about 0.001% to about 2%, by weight of the composition.

17. A fabric treatment composition according to claim 1, wherein the composition has a pH of from about 2 to about 7.

18. A fabric treatment composition according to claim 1, wherein the composition has a pH of from about 3 to about 6.

19. A fabric treatment composition according to claim 1, wherein the composition comprises from about 30% to about 90%, by weight of the composition, of water.

* * * * *